No. 669,906. Patented Mar. 12, 1901.
S. THOMPSON.
SPIKE PULLER.
(Application filed Dec. 22, 1900.)
(No Model.)
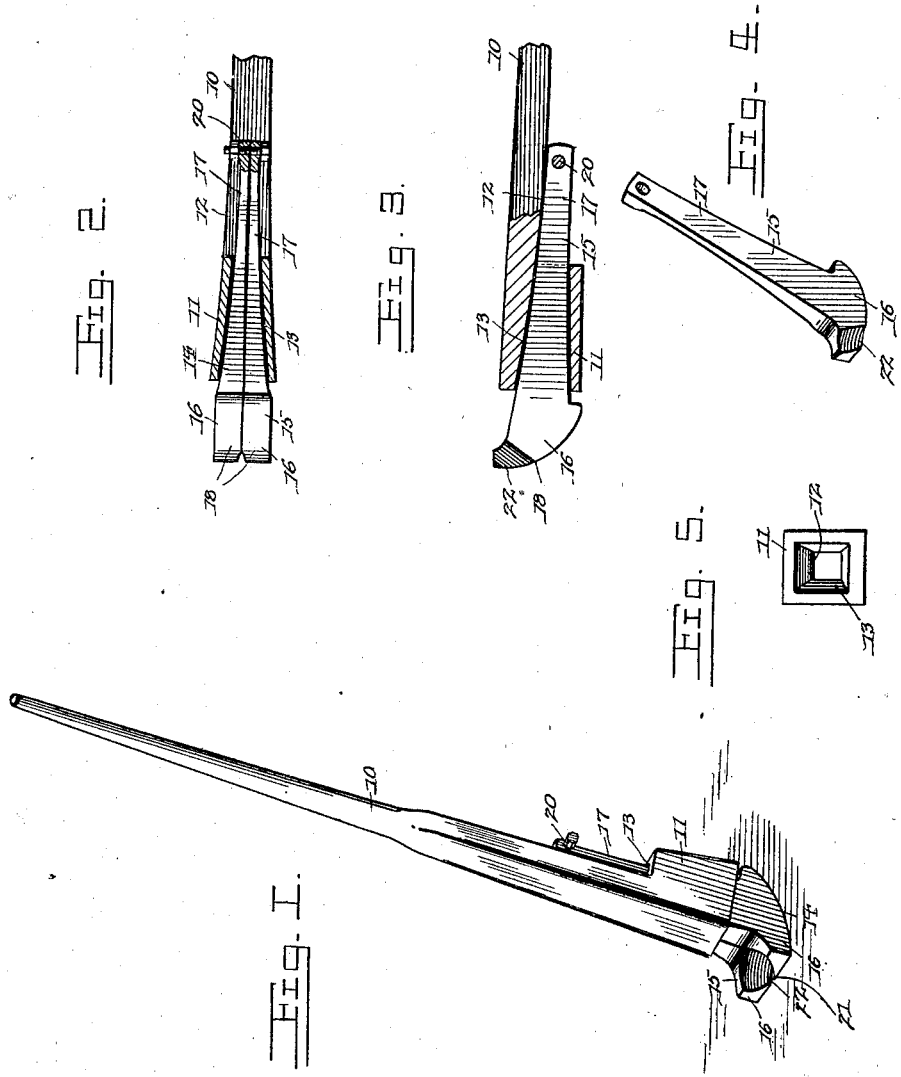

UNITED STATES PATENT OFFICE.

SOLOMON THOMPSON, OF BEDFORD, INDIANA.

SPIKE-PULLER.

SPECIFICATION forming part of Letters Patent No. 669,906, dated March 12, 1901.

Application filed December 22, 1900. Serial No. 40,808. (No model.)

*To all whom it may concern:*

Be it known that I, SOLOMON THOMPSON, a citizen of the United States, residing at Bedford, in the county of Lawrence and State of Indiana, have invented a new and useful Spike-Puller, of which the following is a specification.

This invention relates to spike-pullers, although the principles involved may be embodied in implements for other specific purposes; and one object of the invention is to provide a simple and efficient construction which may be engaged with a spike by downward movement of the operating-bar thereof and which may be then rocked to draw the spike, the structure being such that the bar may be rocked in an opposite direction to permit of placing a fulcrum-block thereunder without releasing its grip upon the spike.

A further object of the invention is to provide a construction that will consist of but few parts, that is durable, and that is cheap of manufacture.

In the drawings forming a portion of this specification, and in which like numerals of reference indicate similar parts in the several views, Figure 1 is a perspective view showing the complete implement in its operative position. Fig. 2 is a sectional view taken through the tapered socket of the bar and showing the gripping-jaws in bottom plan view. Fig. 3 is a partial section taken at right angles to Fig. 2 and showing the inner side of a gripping-jaw. Fig. 4 is a detail perspective view of one of the gripping-jaws. Fig. 5 is an end view of the bar and showing the tapered socket thereof.

Referring now to the drawings, the present implement consists of a single-piece bar 10, the upper portion of which is rounded and tapered to form a handle, while the lower portion thereof comprises a cross-sectionally rectangular portion in the form of a sleeve 11, which projects laterally from one side of the bar, and which bar directly adjacent to the sleeve is flattened, as at 12, to form a continuation of one inner wall of the sleeve. The inner portion of the sleeve is in the form of a socket 13, which is tapered from its lower end in the direction of the upper end of the bar. In connection with this bar having the socketed sleeve there are employed two similar gripping-jaws 14 and 15. Each jaw includes a head 16 and a stem 17, the head having an arcuate end face 18, the chord of which lies at an acute angle to the stem, and which head projects at its ends beyond the side edges of the stem 17. The stems 17 of the jaws are adapted to lie with those portions farthest from the heads in mutual contact, and said stems are slightly curved on their adjacent faces in order that the adjacent faces of the jaws may stand normally apart. The stems of the jaws when disposed face to face present outer faces which converge in the direction of the ends of the stems remote from the heads, while the side edges of the stems converge in the same direction, whereby there will be presented a tapered pair of stems which correspond to the taper of the socket of the sleeve of the bar. The outer ends of the stems are connected by a bolt 20, passed therethrough after the stems have been passed into the sleeve, and which bolt prevents withdrawal of the stems from the socket of the sleeve. The stems of the jaws are of spring metal, and thus if the stems be pressed into the sleeve they will engage the convergent sides thereof and will wedge therebetween, so that the heads of the jaws will be moved together.

The forwardly-projecting portions of the heads of the jaws—that is, the portions thereof most remote from the opposite ends of the stems—are slightly recessed on their inner faces, and these recessed portions are beveled to present gripping-teeth 21 and 22, the recesses being adapted to receive the stem of a spike to be drawn in such position that the sharpened teeth may engage beneath the head thereof. In fact, however, with the present construction it is not necessary that the teeth engage against the head of the spike; but instead they may engage the sides of the spike, the pressure of the teeth against the spike being sufficient to cause the teeth to sink thereinto to a degree sufficient to prevent slipping.

In the operation of this device the stems of the jaws are pushed downwardly through the sleeve, at which time the heads of the jaws will separate, as above described. The implement is then adjusted to receive the spike between the teeth 21 and 22, after which the bar is pressed downwardly to cause the stems to move upwardly through the sleeve and wedge into the socket thereof, causing the teeth to grip in the manner described. By pressing laterally on the bar the bar is rocked on the arcuate faces of the heads of the jaws and the toothed ends thereof are raised to draw the spike. As the jaws do not release the spike until the stems are again moved forwardly through the sleeve, the bar may be raised rockingly to lift the heels of the heads to permit of insertion of a fulcrum-block therebeneath without releasing the spike.

In practice modifications of the specific construction shown may be made, and any suitable materials and proportions may be used for the various parts without departing from the spirit of the invention.

What is claimed is—

1. A device of the class described comprising a bar having a tapered socket, and jaws comprising stems disposed side by side and engaged with the socket and shaped to correspond to the taper of the socket, and heads upon the jaws having fulcrum-faces and provided with gripping-teeth for movement toward each other transversely of the operative movement of the bar when the stems are pressed into the socket.

2. A device of the class described comprising a bar having a tapered socket extending longitudinally thereof, and jaws including heads provided with fulcrum-faces having gripping-teeth and stems disposed slidably in the socket, said stems being tapered to wedge into the socket and move the heads toward each other.

3. A device of the class described comprising a bar having a socket, and jaws including heads having gripping-teeth and stems disposed slidably in the socket, said stems being constructed and arranged to wedge into the socket and move the teeth toward each other transversely of the operative movement of the bar.

4. A device of the class described comprising a bar having a socket, and jaws including tapered stems disposed slidably in the socket and heads having arcuate fulcrum-faces and gripping-teeth, said stems being constructed and arranged to wedge into the socket to draw the teeth toward each other transversely of the operative movement of the bar.

5. A device of the class described comprising a bar having a longitudinally-tapered socket, and jaws having tapered stems disposed slidably in the socket said jaws having arcuate fulcrum-faces having gripping-teeth, said stems being constructed and arranged for movement upwardly into the socket to wedge therein and move the teeth toward each other in a direction transversely of the operative movement of the bar to effect a gripping action.

In testimony that I claim the foregoing as my own I have hereto affixed my signature in the presence of two witnesses.

SOLOMON THOMPSON.

Witnesses:
 FRANK A. CROOKÉ,
 W. H. CROOKE.